United States Patent [19]
Janz

[11] Patent Number: 5,095,393
[45] Date of Patent: * Mar. 10, 1992

[54] TRI-PHASE SERVO PATTERN FOR PROVIDING POSITIONING INFORMATION IN A MAGNETIC DISK DRIVE

[75] Inventor: Donald W. Janz, Oklahoma City, Okla.

[73] Assignee: Seagate Technology, Inc., Scotts Valley, Calif.

[*] Notice: The portion of the term of this patent subsequent to Mar. 7, 2006 has been disclaimed.

[21] Appl. No.: 398,166

[22] Filed: Aug. 24, 1989

Related U.S. Application Data

[60] Continuation-in-part of Ser. No. 275,854, Nov. 25, 1988, Pat. No. 4,864,434, which is a division of Ser. No. 932,814, Nov. 19, 1986, Pat. No. 4,811,135, which is a continuation-in-part of Ser. No. 800,019, Nov. 20, 1985, abandoned.

[51] Int. Cl.⁵ ............................................. G11B 5/596
[52] U.S. Cl. ............................. 360/77.05; 360/78.14
[58] Field of Search ........................... 360/77.05, 78.14

[56] References Cited

U.S. PATENT DOCUMENTS

| | | | |
|---|---|---|---|
| 3,185,972 | 5/1965 | Sippel | 340/174.1 |
| 3,864,740 | 2/1975 | Sordello et al. | 360/77 |
| 4,087,843 | 5/1978 | Louis et al. | 360/78 |
| 4,511,938 | 4/1985 | Betts | 360/77 |
| 4,811,135 | 3/1989 | Janz | 360/77.05 |

OTHER PUBLICATIONS

IBM-TDB, vol. 18, No. 10, Mar. 1976, Track Following Servo System, R. K. Oswald, pp. 3424-3425.
IBM-TDB, vol. 20, No. 1, Jun. 1977, Off-Track Gain Calibration of Position Error Signal, R. S. Palmer, pp. 349-350.
IBM-TDB, vol. 20, No. 5, Oct. 1977, Rotating Record Disk Initialization For Sector Servoing, J. C. Dennison, pp. 1789-1791.
IBM-TDB, vol. 20, No. 5, Oct. 1977, Phase and Location Coded Servo Pattern for Controlling the Magnetic Head in Track Seek and Track Follow Operations, K. H. Schaller, pp. 1792-1794.

*Primary Examiner*—Aristotelis M. Psitos
*Assistant Examiner*—David L. Robertson
*Attorney, Agent, or Firm*—Bill D. McCarthy; Edward P. Heller, III; Louis W. Watson

[57] ABSTRACT

Servo disk, including three types of servo patterns distinguishable by phase, are stored in concentric tracks on a magnetic information storage disk. For phase recognition, the pattern types are arranged in triplets of sectors, each sector having a radially extending plurality of only one type of pattern with consecutive patterns in a sector being separated by three track spacings. The patterns are further arranged in radially repeating frames, each including one of each type of pattern, and the patterns are radially offset within a frame by one track spacing from one type of pattern to the next. The patterns have a radial width greater than a track spacing and, in one embodiment, are divided radially into two portions spaced apart by a distance less than one track spacing.

11 Claims, 5 Drawing Sheets

TRI-PHASE SERVO SIGNALS
FOR HEAD WIDTH = 1.375 TRACK SPACES

TRI-PHASE SERVO ERROR SIGNALS
FOR HEAD WIDTH = 1.375 TRACK SPACES

TRI-PHASE SERVO AGC SIGNALS
FOR HEAD WIDTH = 1.375 TRACK SPACES

TRI-PHASE SERVO PATTERN FOR PROVIDING POSITIONING INFORMATION IN A MAGNETIC DISK DRIVE

CROSS REFERENCE TO RELATED APPLICATIONS

The present application is a continuation-in-part of my U.S. patent application Ser. No. 275,854, now U.S. Pat. No. 4,864,434, filed Nov. 25, 1988 as a divisional application of U.S. patent application Ser. No. 932,814, now U.S. Pat. No. 4,811,135, filed Nov. 19, 1986 as a continuation-in-part of my U.S. patent application Ser. No. 800,019 filed Nov. 20, 1985 and now abandoned.

BACKGROUND OF INVENTION

1. Field of the Invention

This invention relates to magnetic storage devices using transducers or recording heads for reading, writing and erasing data on a movable magnetic storage medium. The data typically are arranged in parallel tracks such that the transducer follows an individual track as the storage medium is moved. For example, in a rotatable disk the data are arranged in concentric tracks with the transducer radially movable with respect to the disk.

2. Brief Discussion of the Prior Art

As data density increases and the space between adjacent tracks is correspondingly reduced, it becomes advantageous to record transducer positioning or servo data on the recording medium, thus permitting more accurate positioning than is possible using exclusively mechanical means. An entire disk surface can be dedicated to servo positioning data, as shown in U.S. Pat. No. 3,864,740 to Sordello et al. granted Feb. 4, 1975. Alternatively, servo data can be written in sectors on the same medium surface containing the working data. This technique is called embedded servo and is disclosed in U.S. Pat. No. 3,185,972 to Sipple, granted May 25, 1965.

Transducer positioning using servo data is accomplished in two stages: coarse positioning or track seeking, in which the head is directed from a random location to a selected track; and fine positioning or track following, during which the transducer, already near the selected track, is maintained in a centered position with respect to the track. Preferably the servo data are divided into multiple frames of equal angular dimension, with servo information repeated in each frame. Also common is the use of sync bits, at least one in each track at the beginning of each frame. The sync bits signal entry into each frame, and establish automatic gain control (AGC) used in recognizing servo signals.

The continuing effort to place increased data on the same disk surface area raises problems of signal interference from servo patterns in tracks adjacent a desired servo track. Adjacent track interference can be reduced simply by reducing the radial dimension of each servo pattern, yet this reduces the dynamic range, meaning loss of a signal when the transducer is not sufficiently close to the servo track. Yet another problem, encountered when servo data is divided into angular frames, is the lack of phase coherence among the sync signals. This is due to the difficulty in placing sync signals from a given frame in exact angular alignment. The result of misalignment is unwanted modulation of the AGC signal.

It is therefore an object of this invention to enable reduced spacing between adjacent servo tracks without a corresponding reduction in the servo pattern radial dimension. Another object of this invention is to increase the signal quality and dynamic range of servo signals by increasing the width of servo patterns on a data storage medium. Yet another object is to provide servo patterns usable to establish an AGC signal, for more consistent AGC signals obtained from various tracks and frames on the storage medium.

SUMMARY OF THE INVENTION

To achieve these and other objects, there is provided an apparatus for controlling the radial position of a transducer movable radially of a rotatable disk in a disk drive. The apparatus includes a magnetic disk, rotatable about an axis. The apparatus further includes a transducer, and support means for supporting the transducer proximate one surface of the disk and for moving the transducer generally radially with respect to the disk. A plurality of first servo patterns on the disk surface form a first servo track generally centered on the axis. A plurality of second servo patterns form a second servo track radially offset from the first servo track. Each of the second servo patterns is angularly offset from one of the first servo patterns. A plurality of third servo patterns on the disk surface form a third servo track radially offset from said first and second servo tracks. Each of the third servo patterns is angularly offset from one of said first servo patterns and one of said second servo patterns. Rotation of the disk causes the servo patterns to move past the transducer, generating an electric signal in the transducer. The support means, responsive to the transducer signal, controls the radial position of the transducer.

Another feature of the present invention is an improved dedicated servo disk, including a disk which is rotatable about an axis. A series of first servo patterns form a first servo track on the disk which is centered on the axis. A second series of second servo patterns form a second servo track radially spaced apart from the first track. A series of third servo patterns form a third servo track on the surface radially spaced apart from the first and second tracks. The second servo patterns are angularly offset from said first servo patterns, and the third servo patterns are angularly offset from the first servo patterns and the second servo patterns.

Preferably the first, second and third servo patterns are arranged in a series of frames equal in angular dimension. A sync signal is placed in each of the servo tracks and near the beginning of each frame, with the first, second and third servo patterns distinguishable from one another based upon their angular distance from the sync signals.

This invention further contemplates an improvement in servo information stored on an information storage medium. The medium has a surface adapted to assume either a first or a second condition. First surface portions of the surface are caused to assume the first condition in accordance with information stored on the medium. The remainder of the surface is caused to assume the second condition. The improvement comprises a first plurality of the first surface portions arranged linearly in a longitudinal direction. A second plurality of the first surface portions are arranged parallel to the first plurality and transversely spaced apart from it. A third plurality of the first surface portions are arranged parallel to the first plurality, and transversely spaced from the first and second pluralities. The surface portions of each plurality are longitudinally offset from the surface portions of the other two pluralities.

Another aspect of the present invention is a process for writing servo information in substantially parallel tracks onto a magnetizable surface of a magnetic information storage medium. The process includes the steps of:
  a. exposing a magnetizable surface of a magnetic storage medium to a first current level to cause said surface to assume a first magnetic polarity;
  b. exposing selected first portions of the surface to a second and opposite current level to form in the surface a first longitudinal array of first servo patterns having a second and opposite magnetic polarity;
  c. exposing selected second portions of the surface to the second current level to form in the surface a second longitudinal array of second servo patterns of the second magnetic polarity and parallel to the first array, and with the second servo patterns longitudinally offset from the first servo patterns;
  d. exposing selected third portions of the surface to the second current level to form in the surface a third longitudinal array of third servo patterns having the second magnetic polarity, parallel to the first and second arrays, and with the third servo patterns longitudinally offset from the first and second servo patterns, and
  e. repeating Steps b–d until the surface contains a desired amount of servo information.

Preferably, each of the servo patterns is formed by moving the medium longitudinally with respect to a recording transducer positioned near the surface, and by supplying current at the second level to the transducer for a selected time, then immediately supplying current at said first level to the transducer for said selected time, and further by interrupting current to the transducer positioned near one of the longitudinal arrays, whenever the transducer is approximately transversely aligned with one of the servo patterns in an adjacent longitudinal array.

Servo patterns in accordance with the present invention can be substantially wider in radial dimension than the nominal track-to-track separation. The result of enlarged servo patterns is increased amplitude servo signals for improved signal to noise ratio, thus to increase the dynamic range of the servo tracks. Alternatively, servo tracks may be positioned closer to one another without any sacrifice in dynamic range. Due to the angular offset, servo patterns in adjacent tracks do not directly overlap and interfere with one another, yet can form an overlapping pattern of servo signals which results in more linear AGC and thus enhanced servo data. Angularly offset servo patterns can be used, in lieu of or in addition to sync signals, to normalize the AGC signal. The result is a more consistent AGC signal and improved recovery from faulty sync signals. The three types of servo patterns generate peak signals having three separate phases, a feature which is advantageously used to measure transducer velocity directly from the phase signals. The tri-phase signals provide a difference signal, the slope of which provides direct velocity information, eliminating the need to integrate transducer actuator current or use other velocity transducing equipment.

Another aspect of the invention is the ready adaptation of the servo system including patterns having a radial width greater than a track spacing to an embedded servo system in which the patterns are read by a read/write head, having a width less than a track spacing, used to read and write data. To this end, the servo patterns can be divided into two portions that are radially spaced by a distance less than a track spacing and provided with overall widths greater than two track spacings. Difference signals derived from one portion of one pattern and the other portion of another pattern then provide position error and velocity information in the same manner that such information is provided by undivided patterns having radial widths greater than a track spacing.

IN THE DRAWINGS

These and other features and advantages of the invention will become apparent upon reading the following detailed description and upon reference to the drawings, in which:

FIG. 8 shows an alternative embodiment of the present invention.

DETAILED DESCRIPTION

Figure 1:
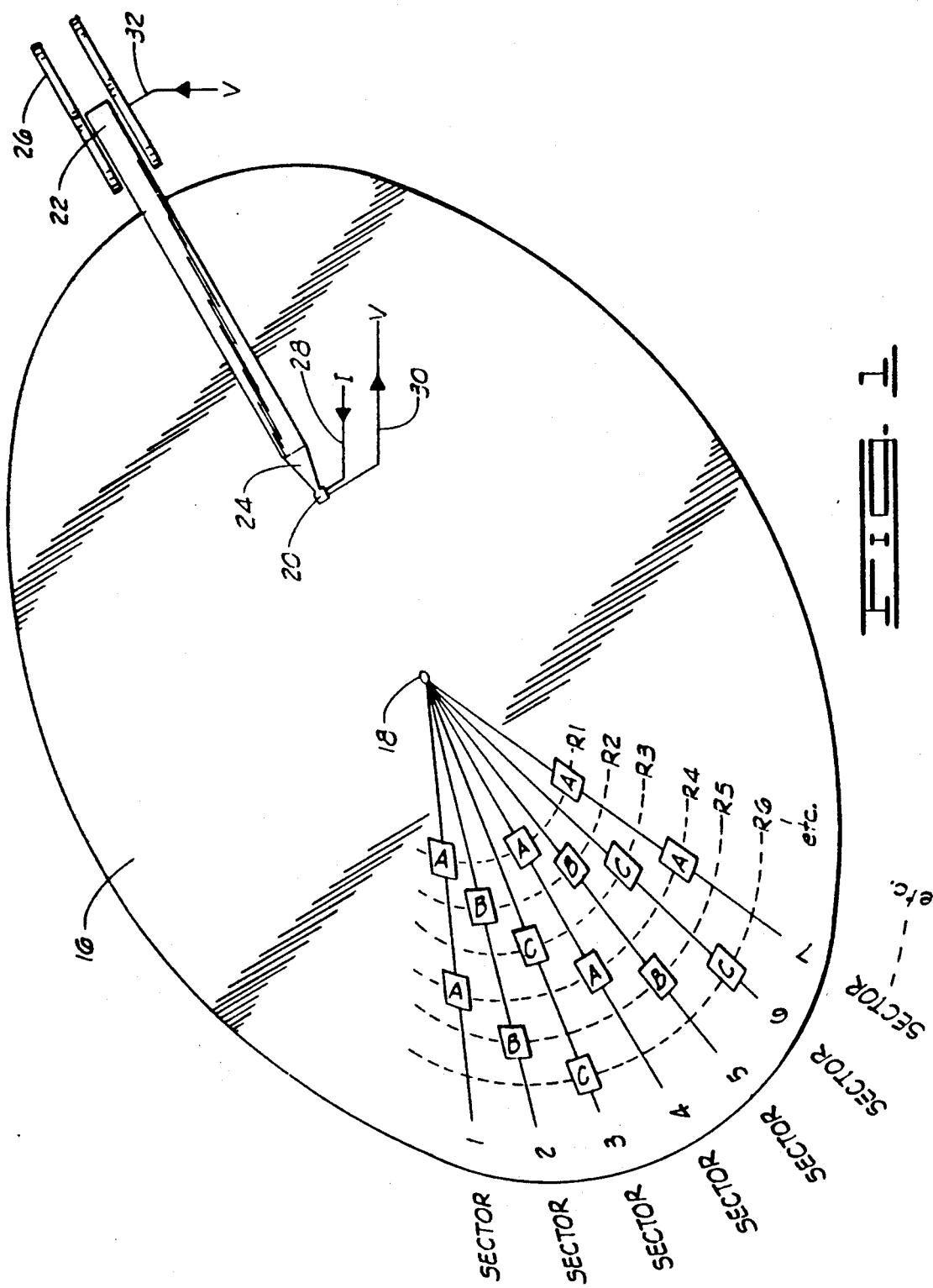
FIG. 1 is a schematic view of a magnetic information storage disk with servo patterns positioned thereon in accordance with the present invention.

In the drawings, there is shown in FIG. 1 a magnetic information storage disk 16 rotatable about a central axis 18 by means of a disk drive, not shown. Disk 16 is a "dedicated servo" disk, and contains no working data—only servo data.

Certain parts of a magnetic disk drive are shown in FIG. 1 to illustrate the writing of information on the upper surface of disk 16 and the subsequent reading of such information. These parts include a read/record transducer 20. The transducer is mounted to a movable carriage 22 by means of a support arm 24. A voice coil 26, mounted to the drive, supports carriage 22 for linear movement toward and away from axis 18, thus moving transducer 20 radially with respect to the disk. Typically, carriage movement and position are controlled through controlling electrical current to the voice coil 26. By varying the transducer radial position and rotating disk 16 with a drive motor (not shown), information may be written at any desired location on the disk surface.

Servo information is written on disk 16 by introducing an electrical current I to the transducer through a first line 28, with the transducer positioned over a selected portion of the disk surface. Transducer 20 also is adapted to read information previously written on disk 16, generating an electrical signal as represented by voltage V in a second line 30. As indicated by a third line 32, voltage V is an input to voice coil 26. Responsive to the V input, and a source of velocity commands (not shown), voice coil 26 either moves carriage 22 or maintains it substantially stationary in order to control the radial position of the transducer.

Shown on part on the surface of the disk 16 are six servo groups, R1-R6, radially and uniformly spaced apart from one another and generally concentric about axis 18. Each group can be a separate ring, or all groups can be part of a continuous spiral group, there being a selected index or angular position on disk 16 as a cutoff point between a group and the next subsequent group.

Three types of servo pattern groups, labelled A, B and C respectively, are written on disk 16 during formatting, and need not be rewritten during normal operation. Servo pattern groups R1 and R4 contain only type A servo patterns, servo pattern groups R2 and R5 contain only type B servo patterns, while servo pattern groups R3 and R6 contain servo patterns only of type C. It should be understood that this sequence of A, B and C is repeated for the desired number of servo tracks on disk 16, typically in the hundreds or thousands.

Servo patterns A, B and C are further arranged angularly in sectors and radially in groups, such as represented by radii 1-7. Radii 1, 4 and 7 contain only type A servo patterns, radii 2 and 5 contain only type B patterns, while radii 3 and 6 contain only type C patterns. This A, B and C sequence is repeated through the entire revolution of disk 16. Servo patterns A, B and C thus are radially and angularly offset from one another, and arranged in a repeating sequence both in the radial and angular directions. Each individual A, B and C pattern written by transducer 20 can be also read by transducer 20 at a later time for purposes of indicating radial position of arm 22 on disk 16. As is well understood by those skilled in this art, a transducer 20 when writing on a disk 16 produces individual A, B, and C patterns whose physical width, which is measured along a disk 16 radius (vertically in FIG. 2), is related to the width of the flux gap of transducer 20 itself, also measured along a radius and usually approximately equal to the physical width of the flux gap transducer 20. During reading the transducer produces a signal whenever a pattern passes beneath it. The strength of that signal is approximately proportional to the radial width of the portion of the transducer 20 flux gap beneath which the pattern sweeps. Thus, if the pattern sweeps beneath 40% of the gap width, the level of the signal generated by the winding of transducer 20 will be approximately 40% of the level generated by a pattern sweeping beneath all of the width of the transducer 20 flux gap. Thus, the signal level from transducer 20 is a measure of its alignment with a particular pattern. In general, the apparent width of a transducer 20 flux gap when reading substantially equals that when writing, and both are substantially equal to the physical width of the transducer itself.

Figure 2:
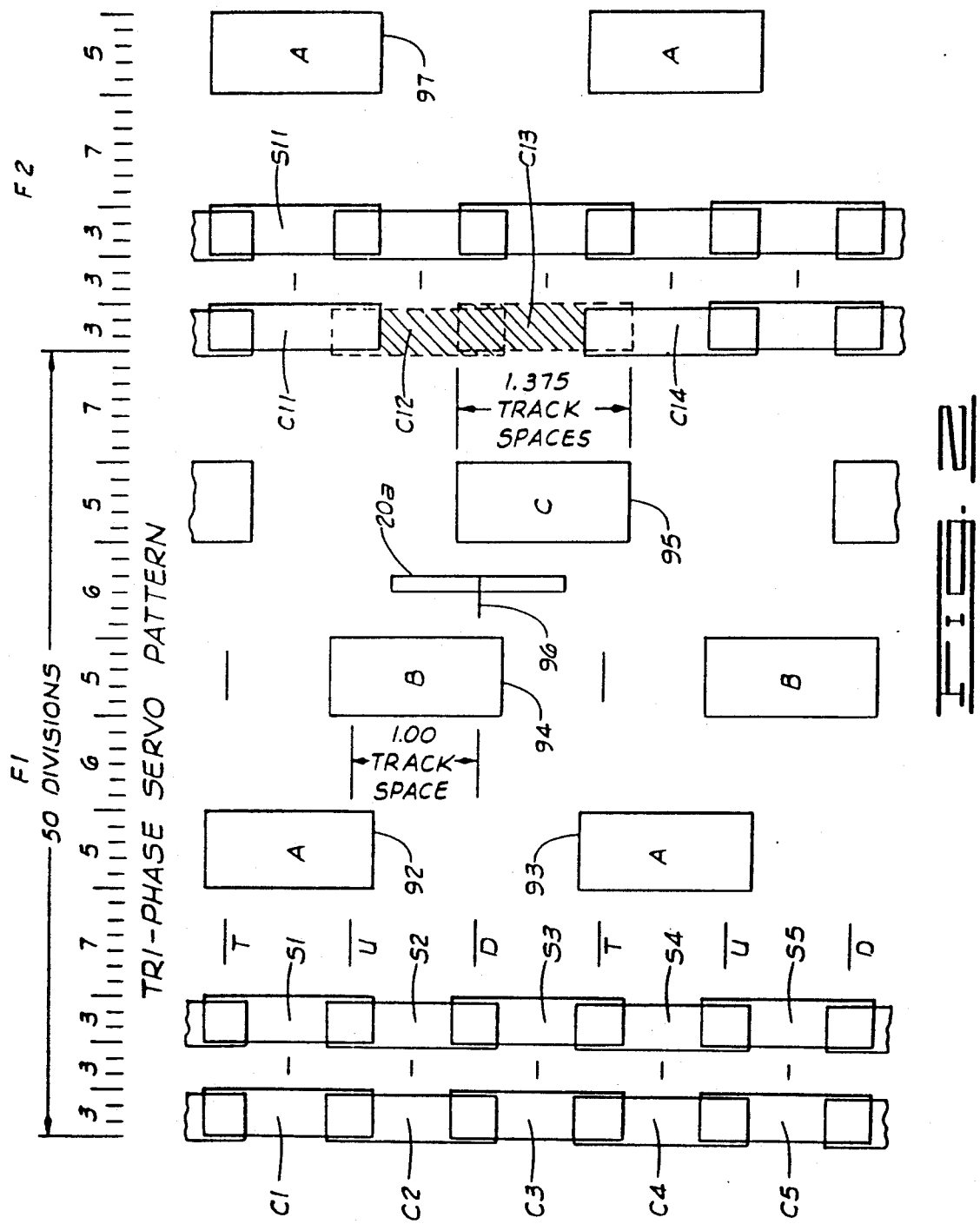
FIG. 2 is an enlarged schematic view showing a surface portion of the disk of FIG. 1.

Each group of consecutive radii containing A, B and C servo patterns forms one of a series of substantially identical data frames F. One such frame F1, and a portion of the following frame F2, is shown in FIG. 2, which is an enlargement of a selected portion of the surface of disk 16.

At the leading edge of frame F1 is a column of overlapping code bits C1, C2, C3, C4 and C5 corresponding to servo tracks R1 through R5. Spaced angularly from the code bits is a column of sync bits S1, S2, S3, S4 and S5. Neighboring code and sync bits overlap one another, and are slightly angularly displaced from one another because it is not possible with current technology to align them perfectly.

The code bits are used to indicate an index (a specific angular location) and to indicate the innermost and outermost servo tracks. For example, an index can be marked by intentionally avoiding writing code bits, as indicated at C12 and C13. Sync bits contribute to establishing the level for automatic gain control (AGC), and they enable differentiation between servo patterns A, B and C based on their difference in phase or angular location. Each data frame consists of 50 equal divisions. The lead edge of each servo pattern A is approximately seven divisions distant from the trailing edge of its associated sync bit (e.g., S1 of S4). The leading edge of each servo pattern B is separated from the trailing edge of its corresponding sync signal by approximately eighteen divisions, while the distance between the leading edge of each servo pattern C and the end of its associated sync bit is twenty-nine divisions. This difference in separation is sufficient to avoid any overlap between the patterns in adjacent servo groups. As a result, the electrical signal generated by transducer 20 when positioned over rotating disk 16, can be recognized as a signal of three separate phases, one phase corresponding to each type of servo pattern.

Note that the angular offset enables servo patterns A, B and C to have a radial dimension wider than the corresponding radial distance between servo track centers In this instance the servo pattern width is equal to 1.375 times the track space, though the optimal pattern width can vary with the specific application. These wider servo patterns have been found to improve signal amplitude by 43 percent. The greater signal amplitudes thus permit improved accuracy in positioning transducer 20. FIG. 2 also shows on the frame F1 the projection 20a of the flux gap of the transducer 20 which reads and writes the servo patterns with relative movement from left to right on the medium. Projection 20a represents the physical width of the transducer 20 and can be seen to be substantially equal in radial width to each servo, sync and code pattern as originally written. Gap projection 20a represents transducer 20 which has just swept past B pattern 94 at a radial position which generates a signal whose level is approximately 65% of maximum in that approximately 65% of the gap width passed over B pattern 94. Transducer 20 as shown by projection 20a is positioned to continue its motion by sweeping next across C pattern 95. By comparing the appropriate two signal levels the control system can determine the radial movement of transducer 20 necessary to center it on a desired track. In fact, the gap projection 20a is shown radially positioned so as to allow C pattern 95 to sweep past about 65% of transducer 20's width.

With the two signals thus generated by B pattern 94 and C pattern 95 nearly equal, the transducer 20 is by definition centered on a track whose centerline is indicated by the D hash mark 96. By selecting different pair combinations of radially adjacent A, B and C patterns for comparison and shifting transducer 20 to equalize the signal levels from each pattern type in the pair, the transducer 20 can be centered on any desired track. Each such track is radially spaced from its neighbors by the original radial spacing of adjacent A, B and C pattern groups. The individual A, B and C pattern signals may be identified by the time which elapses from the sync bit signal to the A, B or C pattern signal, the times for each of the three types being different from each other. Thus, it may be seen that transducer 20 may have a width or radial dimension greater than the individual track spacings and yet be able to both write and read the individual A servo patterns 92, 93, etc. Further, it can be seen that each radially aligned pattern group, i.e., all patterns at the same nominal radius, in conjunction with a radially adjacent group define a single servo track. Thus, the number of pattern groups plus one equals the number of servo tracks.

Figure 3:
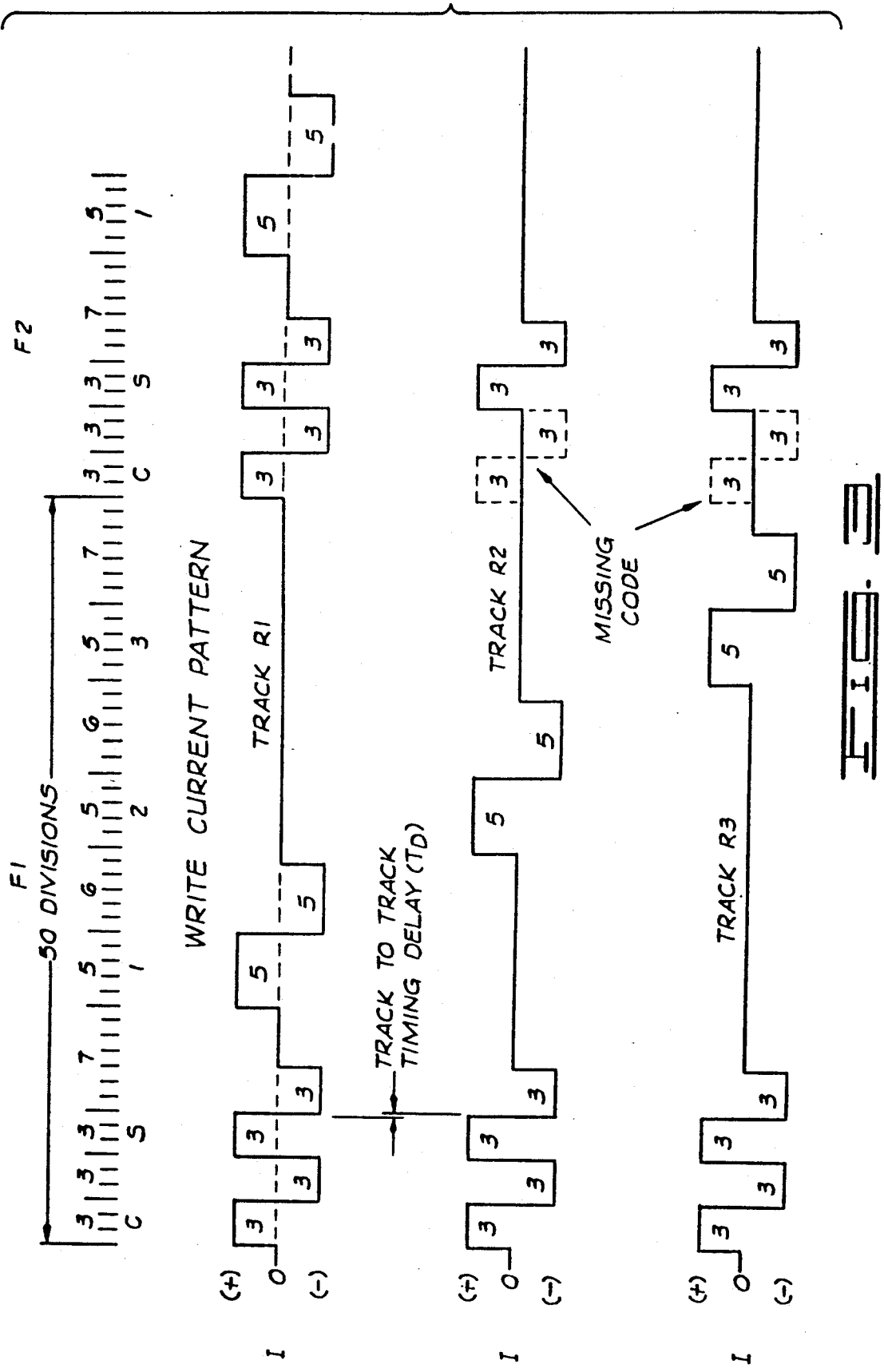
FIG. 3 is a graphical representation of a timing diagram corresponding to the disk surface portion of FIG. 2 illustrating the writing of servo information on the disk.

FIG. 3 shows how direct current is introduced to transducer 20 while disk 16 is rotated, in order to write servo patterns A, B and C on the disk. The writing of servo pattern groups R1, R2 and R3 is illustrated. In each case, as disk 16 is rotated over the desired servo pattern location, transducer 20 is subjected to one of three levels of the direct current; a positive level, a substantially equal but negative level, and a zero level equivalent to the absence of any current. The whole disk surface is first subjected to the negative current level to cause it to assume a first magnetic state or condition, e.g., "north". Each code bit and each sync bit then is written with positive current over three angular divisions, followed immediately by negative current over three angular divisions. In each case, it is the three divisions of positive current which actually forms the bit, by causing the surface portion to assume a second and opposite magnetic state, e.g., "south". The trailing three divisions of negative current serve to balance the positive current and avoid magnetization of transducer 20.

Servo patterns A, B and C also are written with positive current, followed by negative current for an equal number of divisions. In FIG. 3, this number of divisions is five, although this is not critical. The zero level of current is applied whenever transducer 20, when writing track R2, for example, is angularly aligned with either servo pattern A in track R1 or with servo pattern C in track R3. Thus, interference with neighboring tracks during write is avoided.

The broken lines in tracks R2 and R3 indicate where code bits are intentionally not written in order to mark an index, corresponding to the cross hatched areas C12 and C13 in FIG. 2. The track-to-track timing delay is an unwanted consequence of the inability to exactly align the sync and code bits as previously explained.

Figure 4:
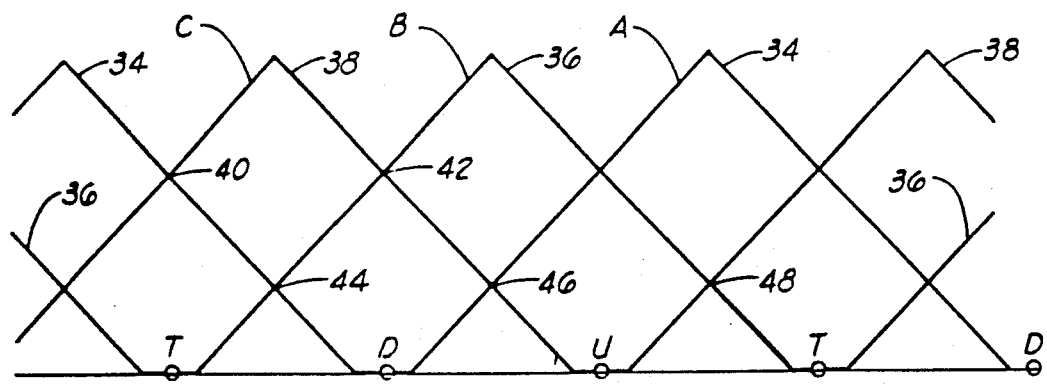
FIG. 4 is a graphical representation of the signals generated by the servo patterns.

FIG. 4 shows peak voltage levels, generated by a series of servo patterns passing by transducer 20 when disk 16 rotates. A first peak voltage signal 34 is generated by servo patterns A, a second peak voltage signal 36 is generated by servo patterns B, while a third peak voltage signal 38 is generated by type C servo patterns. Signals 34, 36 and 38 are shown over a radial traverse of transducer 20 covering four data tracks labelled T, D, U, and again T to show the beginning of the next sequence. Each data track is radially located midway between its two most adjacent servo tracks. Also, if a surface on disk 16 is dedicated to servo data, tracks T, D and U will then be on a different disk surface. Thus, the proper centering of a data head on a data track corresponds to the positioning of transducer 20 equidistant from the two adjacent servo groups.

Whenever transducer 20 is positioned midway between adjacent servo groups, the voltage level of signals from the tracks are equal. This is graphically represented by a series of comparison or "null" points, one corresponding to each of data tracks T, D and U. For example, when a data head is centered on track T, peak signal 34 generated by servo patterns A equals peak voltage signal 38 generated by servo patterns C as indicated at null point 40. Likewise, with a data transducer centered at track D, peak voltage signals 36 and 38 generated by servo patterns B and C are equal, at point 42.

Three additional comparison points at 44, 46 and 48 are generated when transducer 20 is located directly on a servo pattern group. For example, with transducer 20 directly on a servo pattern group consisting of type B servo patterns, peak voltage signals 38 and 34 of servo patterns C and A are equal.

Figure 5:
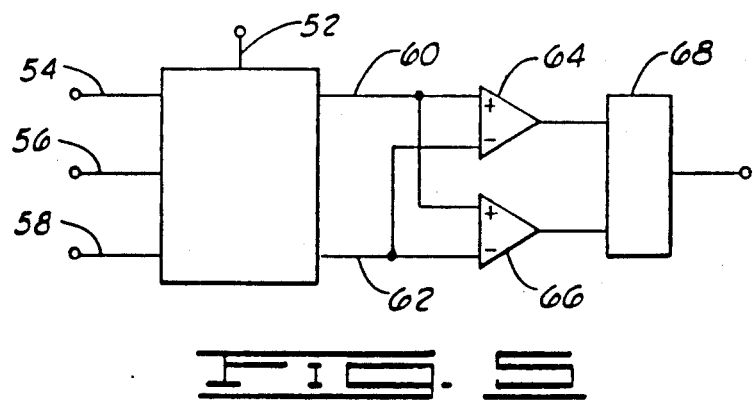
FIG. 5 is a schematic view of apparatus illustrating the recovery of information using the signals in FIG. 4.
Figure 6:
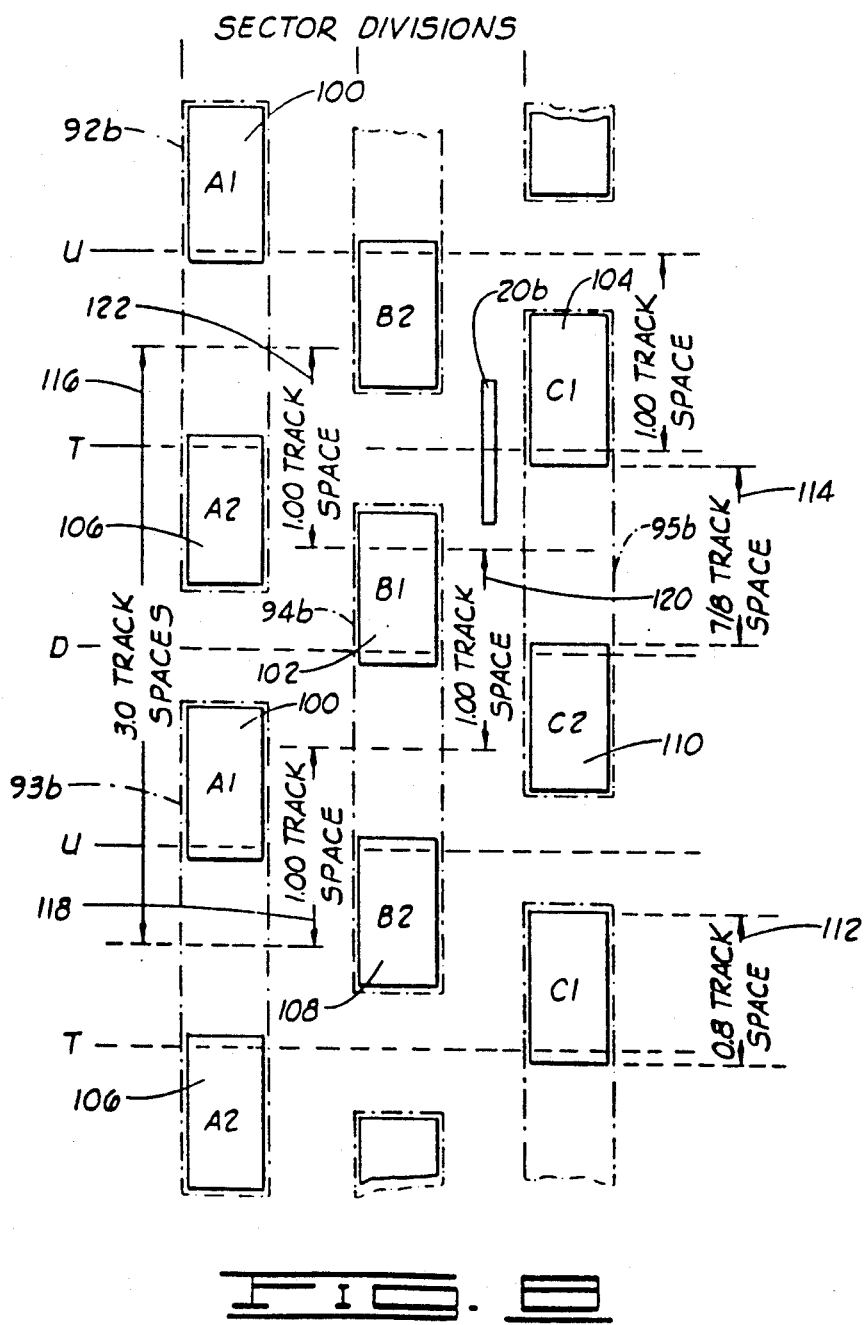

The tri-phase servo signals can be selectively compared and accumulated in order to control the position of transducer 20 as is illustrated in FIG. 5. A pulse detector 50 has four inputs: a clocking input 52, a type A input 54 corresponding to peak voltage signal 34, a type B input 56 corresponding to signal voltage level 36, and a type C input 58 corresponding to peak voltage signal 38. Pulse detector 50 has two outputs 60 and 62 corresponding to selected pairs of inputs 54, 56 and 58.

The clocking input 52 generated by a sync pattern S1, S2, etc. (shown in FIG. 2) enables the selection of a pair of inputs 54, 56 and 58 as the pulse detector outputs. Of the three phases of incoming signals 34, 36 and 38, the two phases of the desired pair are selected in accordance with the selected data track location. For example, for data track U the inputs selected are 54 and 56 corresponding to peak voltage signals 34 and 36 generated by type A servo patterns 92, 97, etc. and type B servo patterns 94, etc., respectively.

The pulse detector outputs are compared in a subtracting amplifier 64, and accumulated in a cumulative amplifier 66. Both amplifier outputs are fed to a microprocessor 68 (or, alternatively, an integrated circuit), which generates movement and velocity commands to voice coil 26 in order to control the position of transducer 20.

Figure 6:
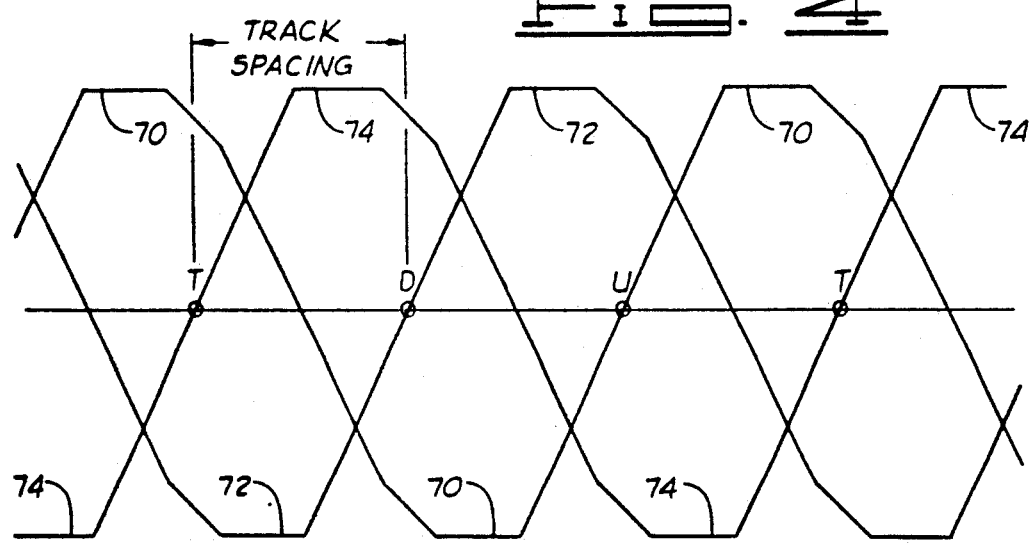
FIG. 6 is a graphical representation of difference signals obtained by comparing selected pairs of the signals in FIG. 4.

FIG. 6 shows the difference signals provided to microprocessor 68 by subtracting amplifier 64 over a radial transducer displacement corresponding to that shown in FIG. 4. Difference signal 70 represents the difference between signals 34 and 36, difference signal 72 represents the difference between signals 36 and 38, while difference signal 74 represents the difference between signals 38 and 34.

When transducer 20 crosses the half track point 46 or 48 while moving toward data track U as shown in FIG. 4, inputs 54 and 56 are selected as the pulse detector output and amplifier 64 supplies difference signal 70 (FIG. 6) to microprocessor 68. In similar fashion, difference signal 74 is the output of amplifier 64 whenever transducer 20 is within a half track spacing of data track T while difference signal 72 is the amplifier output whenever the transducer is within a half track of data track D.

The resultant signal is a sawtooth wave, inclining upwardly and to the right in FIG. 6, having a zero value at the center of the corresponding data track, then experiencing a sharp vertical drop as the head approaches the next data track. Transducer radial velocity can be derived by differentiating this sawtooth wave with respect to time, disregarding the vertical drop when switching between successive signals (midway between zero points).

Transducer radial velocity is derived directly from the difference signal, the slope of which varies linearly with velocity. As the slope of the sawtooth wave is always positive when moving rightward as viewed in FIG. 6 (disregarding the instantaneous vertical drop corresponding to crossing each servo track). velocity can be derived directly from the slope of the difference signal. There is no need for the less reliable approach of integrating transducer actuator current, or for any additional velocity transducing equipment.

Figure 7:
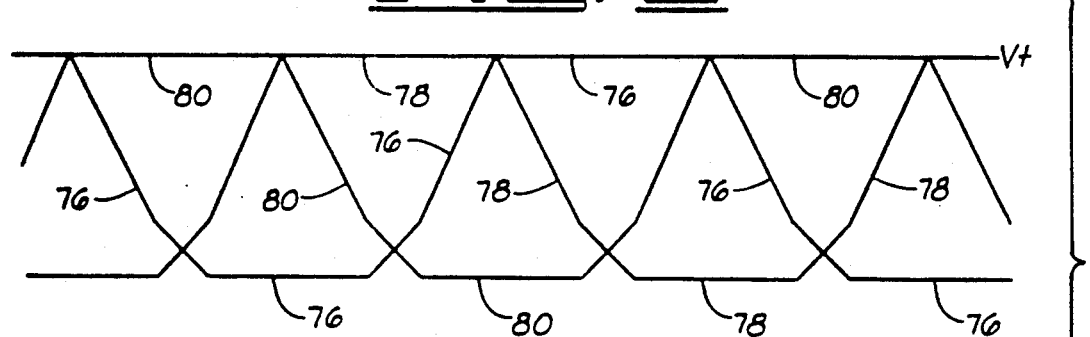
FIG. 7 is a graphical representation of summing signals obtained by combining selected pairs of the signals in FIG. 4.

FIG. 7 shows three cumulative signals: a signal 76 obtained by adding peak voltage signals 34 and 36 in FIG. 4; a cumulative signal 78 obtained by adding voltage signals 36 and 38; and a cumulative signal 80 obtained by the addition of voltage level signals 34 and 38.

As was the case in connection with subtracting amplifier 64 the pulse detector outputs fed to cumulative amplifier 66 are controlled by the radial location of transducer 20. For example, when transducer 20 is within one half track space of data track U, pulse detector inputs 54 and 56 are selected, to produce an output of amplifier 66 corresponding to the sum of voltage level signals 34 and 36. The effect of sensing selected pairs of inputs 54, 56 and 58 in accordance with the particular data track traversed is a straight line V+ indicating a constant voltage level. When used to establish AGC level, V+ is a substantial improvement over the sync signal. Because the corresponding servo patterns A, B and C are angularly offset, there is no overlapping of adjacent servo patterns and no problem with the sync bit track-to-track timing delay illustrated in FIG. 3 which avoids phase coherence problems.

FIG. 8 is equivalent to FIG. 2, but illustrates an embodiment in which the servo patterns A, B, and C, indicated in dot-dash lines, are each divided into two radially spaced portions having radial widths less than the separation distance between adjacent data tracks for generation of servo signals using a read/write head having a radial width less than a track spacing. Thus, as shown in FIG. 8, the servo patterns 92b, 93b, 94b, and 95b, corresponding to the servo patterns 92, 93, 94, and 95 respectively of FIG. 2, are each comprised of a radially outermost first portion A1, B1, and C1 and a radially innermost second portion A2, B2, and C2. (The outermost, or A1, portions of the A patterns 92b and 93b have been designated by the reference numeral 100; the outermost, or B1, portion of the B pattern 94b has been designated by the reference numeral 102; and the outermost, or C1, portion of the C pattern 95b has been designated by the numeral 104. Similarly, innermost, or A2, portions of the A patterns 92b and 93b have been designated by the reference numeral 106; the innermost, or B2, portion of the B pattern 94b has been designated by the reference numeral 108; and the innermost, or C2, portion of the C pattern 95b has been designated by the numeral 110.)

Each of the portions 100, 102, 104, 106, 108 and 110 has a radial width substantially equal to the physical width of the transducer 20 as indicated by the projection 20b thereof in a position in which the transducer has just swept past the B pattern 102. As shown at 112 for a C1 portion, this width is preferably eight-tenths of a track spacing. A suitable separation for the two portions of each A, B, and C pattern is seven-eighths of a track spacing, as shown at 114 for the C pattern 95b, so that the total radial width of each of the A, B, and C patterns is approximately two and a half track spacings.

As in the embodiment shown in FIG. 2, the A, B and C patterns are arranged in a plurality of radial sectors, indicated at the top of FIG. 8, that each contain a radially extending plurality of only one type of pattern, A, B, or C, and the A, B, or C patterns within one sector are radially offset, one from another by a distance of three track spacings as indicated at 116 for the A patterns 92b and 93b. Similarly, as in the embodiment shown in FIG. 2. the sectors are arranged in frames which each include one A pattern, one B pattern and one C pattern, one such frame being comprised of the patterns 93b, 94b and 95b. Further, and again as for the embodiment shown in FIG. 2, the frames are repeated radially from a selected inner radius on the disk to a selected outer radius thereon. Finally, within each frame and as for the embodiment shown in FIG. 2, the B patterns are radially offset one track spacing from the adjacent A pattern, as shown at 118 for the pattern 93b and 94b, and the C patterns are offset a further track spacing from the B patterns as shown at 120 in FIG. 8. Thus, the C pattern in one frame will be radially offset one track spacing from the A pattern of the succeeding frame as shown at 122 in FIG. 8.

The use of the embodiment shown in FIG. 8 can best be understood through a comparison of FIGS. 2 and 8 and, in particular, the manner in which the embodiment shown in FIG. 8 is derived from the embodiment shown in FIG. 2. As shown in both Figures, an A pattern extends across two tracks, labelled U and T in both drawings. (The U and T tracks have been interchanged in FIG. 8 with respect to FIG. 2. Such interchange has no effect on the operation of the servo system.) Similarly, each B pattern extends across U and D tracks and each C pattern extends across D and T tracks. However, in contrast to FIG. 8, the A, B and C patterns in FIG. 2 extend in an unbroken fashion between the corresponding tracks and, further, extend a selected distance beyond each of the two tracks to provide widths for the A, B and C patterns that exceed a track spacing for development of sum and difference signals in the manner described above with reference to FIGS. 4 through 7. The patterns shown in FIG. 8 are derived from those shown in FIG. 2 by bisecting each of the patterns shown in FIG. 2 followed by reflection of each of the resulting portions about the track the portion crosses and extension of the ends of the portions that are directed away from the other portion. Thus, the portion 100 of the pattern 92b in FIG. 8 corresponds to the upper half of the pattern 92 in FIG. 2 while the portion 106 of the pattern 92b in FIG. 8 corresponds to the lower half of the pattern 92 in FIG. 2. Accordingly, where the patterns shown in FIG. 2 each extend from a position midway between two tracks to overlap the tracks, the patterns shown in FIG. 8 extend from positions exterior to the same two tracks to overlap the two tracks; for example, the portions 102 and 108 of the pattern 94b in FIG. 8 extend from locations between T and D tracks and between T and U tracks, respectively, to overlap adjacent U and D tracks while the pattern 94 in FIG. 2 extends directly between the U and D tracks to overlap such tracks. In both cases each track is overlapped by a portion of each of two patterns to enable the generation of the signals discussed above. In particular, sum and difference signals indicative of the position of the transducer 20 with respect to a U track are generated from A1 and B2 portions of A and B patterns in the embodiment shown in FIG. 8 in precisely the same manner that such signals are generated for a U track by A and B patterns in the embodiment shown in FIG. 2; signals indicative of the position of the transducer 20 with respect to a D track are generated from B1 and C2 portions of B and C patterns in the embodiment shown in FIG. 8 in precisely the same manner that such signals are generated for a D track by B and C patterns in the embodiment shown in FIG. 2; and signals indicative of the position of the transducer 20 with respect to a T track are generated from C1 and A2 portions of C and A patterns in the embodiment shown in FIG. 8 in precisely the same manner that such signals are generated for a T track by C and A patterns in the embodiment shown in FIG. 2.

It is understood that this invention can be practiced in connection with recording media other than magnetic disks. For example, in any medium capable of assuming two distinguishable states or conditions, servo patterns can be formed in the recording medium as longitudinal arrays, with neighboring longitudinal arrays consisting of servo patterns longitudinally offset from one another.

What is claimed is:

1. In a disk drive, apparatus for controlling the radial position of a transducer movable radially on a rotatable disk, including:
   a magnetic disk, rotatable about an axis and adapted to carry a plurality of servo pattern groups, each group radially offset a preselected track separation distance from those adjacent to it, each group having a radial dimension greater than the track separation distance and having two portions radially spaced by a distance less than the track separation distance;
   a transducer for reading magnetic servo patterns on said magnetic disk said transducer having a radial gap dimension smaller than the track spacing, and support means for supporting said transducer proximate one surface of said disk and for moving said transducer generally radially with respect to said disk, responsive to a velocity command;
   a plurality of first servo pattern groups on said surface, the patterns in each first group radially offset by three preselected track separation distances from an adjacent first group and generally centered on said axis;
   a plurality of second servo pattern groups on said surface, the patterns in each second group radially offset by one preselected track separation distance from a first servo pattern group, and each of said second servo patterns being angularly offset from the first servo patterns;
   a plurality of third servo pattern groups on said surface, each third pattern group comprising third patterns radially offset from an adjacent second servo pattern group by one preselected track separation distance, each of said third servo patterns being angularly offset from the first servo patterns and the second servo patterns, and each portion of each of said first, second, and third servo patterns having the radial dimension of the transducer gap;
   said disk, as it rotates, moving said servo patterns past said transducer to generate electric signal pulse outputs from said transducer; and
   a pulse detector receiving the transducer signal pulse outputs and comparing the pulses generated by radially adjacent groups of servo patterns, and responsive thereto providing velocity commands to the support means to move the transducer into alignment with a track.

2. The apparatus of claim 1 including further first, second and third repeating servo patterns defining servo pattern groups, wherein all of said servo pattern groups are arranged in a repeating sequence radially outward consisting of a first servo pattern group, a radially adjacent second servo pattern group whose centerline is one preselected separation distance from the centerline of the adjacent first servo pattern group and a radially adjacent third servo pattern group whose centerline is one preselected separation distance from the centerline of the second servo pattern group and also one preselected track separation distance from the centerline of another adjacent first servo pattern group.

3. The apparatus of claim 1 wherein said servo patterns are arranged in a plurality of radial sectors, each sector including a plurality of only one of said first, second and third servo patterns.

4. The apparatus of claim 3 wherein said sectors are arranged in repeating angular frames, each frame including a sector of said first servo patterns, followed by a sector of said second servo patterns, followed by a sector of said third servo patterns.

5. The apparatus of claim 1 wherein the radial separation between the two portions of said first, second and third servo patterns is approximately seven-eighths of the separation distance between adjacent servo tracks.

6. The apparatus of claim 5 wherein the radial dimension of said first second and third servo patterns equals approximately two and a half times the separation distance between adjacent servo tracks.

7. The apparatus of claim 1 wherein the radial dimension of said first second and third servo patterns equals approximately two and a half times the separation distance between adjacent servo tracks.

8. The apparatus of claim 1 wherein the disk's magnetic pattern further includes a pattern of polarity opposite that of the first through third servo patterns and which occupies areas of the disk between individual patterns within each servo track.

9. The apparatus of claim 1 further including means for positioning the transducer in each of the desired servo pattern groups and means for generating and providing to the transducer direct current pulses of predetermined level as the desired positions for servo patterns pass under the transducer, whereby the servo patterns are generated to comprise the servo pattern groups.

10. The apparatus of claim 9 wherein the current generating means further comprises means for providing a level of zero current to the transducer when no servo pattern position is under the transducer.

11. The apparatus of claim 9, wherein the magnetic disk is further adapted to carry a plurality of data tracks, each data track radially positioned with its centerline substantially midway from the radial centerlines of the servo patterns in a pair of servo pattern groups radially adjacent to each other.

* * * * *